US010667155B2

(12) United States Patent
Ouyang et al.

(10) Patent No.: US 10,667,155 B2
(45) Date of Patent: May 26, 2020

(54) METHODS AND SYSTEMS FOR EVALUATING VOICE CALL QUALITY

(71) Applicant: Verizon Patent and Licensing Inc., Arlington, VA (US)

(72) Inventors: Ye Ouyang, Warren, NJ (US); Krishna Pichumani Iyer, Basking Ridge, NJ (US); Zhenyi Lin, Madison, NJ (US); Le Su, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 137 days.

(21) Appl. No.: 16/036,253

(22) Filed: Jul. 16, 2018

(65) Prior Publication Data
US 2020/0022007 A1    Jan. 16, 2020

(51) Int. Cl.
*H04W 24/08* (2009.01)
*G10L 25/60* (2013.01)
*G10L 15/26* (2006.01)
*G10L 15/22* (2006.01)

(52) U.S. Cl.
CPC ............. *H04W 24/08* (2013.01); *G10L 15/22* (2013.01); *G10L 15/265* (2013.01); *G10L 25/60* (2013.01)

(58) Field of Classification Search
None
See application file for complete search history.

(56) References Cited

U.S. PATENT DOCUMENTS

| | | | | |
|---|---|---|---|---|
| 9,119,086 | B1* | 8/2015 | Ouyang | H04W 24/02 |
| 2010/0332230 | A1* | 12/2010 | Shu | G10L 15/01 |
| | | | | 704/253 |
| 2016/0088502 | A1* | 3/2016 | Sanneck | H04W 24/08 |
| | | | | 370/242 |
| 2017/0352346 | A1* | 12/2017 | Paulik | G10L 15/063 |
| 2018/0006957 | A1* | 1/2018 | Ouyang | H04L 47/2416 |

OTHER PUBLICATIONS

Karpagavalli S. et al., A Review on Automatic Speech Recognition Architecture and Approaches, International Journal of Signal Processing, Image Processing and Pattern Recognition, vol. 9, No. 4, p. 393-404, 2016.
M. A. Anusuya et al., Speech Recognition by Machine: A Review, (IJCSIS) International Journal of Computer Science and Information Security, vol. 6, No. 3, p. 181-205, 2009.
N. Côté, Diagnostic Instrumental Speech Quality Model, Integral and Diagnostic Intrusive Prediction of Speech Quality, p. 133-186, 2011.

(Continued)

*Primary Examiner* — Otis L Thompson, Jr.

(57) ABSTRACT

A method, a device, and a non-transitory storage medium for estimating voice call quality include performing automatic speech recognition, for each of a plurality of voice calls, to generate recognized text for both an originating device acoustic signal and a receiving device acoustic signal. The recognized text for both the originating device acoustic signal and the receiving device acoustic signal are compared to the reference text to identified recognition errors and a voice call quality score for each of the originating device acoustic signal and the receiving device acoustic signal are determined. A correlation between the network conditions and the voice call quality scores is then determined.

20 Claims, 8 Drawing Sheets

(56) References Cited

OTHER PUBLICATIONS

Duy-Huy Nguyen et al., A New Non-intrusive Model for Measuring VoLTE Quality based on Wideband E-model, Communications on Applied Electronics, vol. 8, No. 5, p. 1-8, Aug. 2016.

Alessandro Vizzarri, Analysis of VoLTE End-To-End Quality of Service using OPNET, Modeling Symposium (EMS), IEE Computer Society, p. 452-457, Oct. 2014.

John G. Beerends et al., Perceptual Objective Listening Quality Assessment (POLQA), The Third Generation ITU-T Standard for End-to-End Speech Quality Measurement Part I—Temporal Alignment, Journal of the Audio Engineering Society, vol. 61, No. 6, p. 366-384, Jun. 2013.

Duy-Huy Nguyen et al., Predicting VoLTE Quality using Random Neural Network, International Journal of Applied Information Systems, vol. 11, No. 3, p. 1-5, Aug. 2016.

Geoffrey Hinton et al., Deep Neural Networks for Acoustic Modeling in Speech Recognition, IEE Signal Processing Magazine, vol. 29. No. 6, p. 82-97, Nov. 2012.

M Series, IMT Vision-Framework and overall objectives of the future development of IMT for 2020 and beyond, International Telecommunication Union, p. 1-19, 2015.

Dario Amodei et al., Deep Speech 2: End-to-End Speech Recognition in English and Mandarin, International Conference on Machine Learning, p. 173-182, Jun. 2016.

Recommendation ITU-T G.107, The E-model: a computational model for use in transmission planning, Series G: Transmission systems and media digital systems and networks, p. 1-22, Jun. 2015.

Recommendation ITU-T P.800, Methods for Subjective Determination of Transmission Quality, Series P: Telephone Transmission Quality, Aug. 1996.

Recommendation ITU-T P.862, Perceptual evaluation of Speech quality (PESQ): An objective method for end-to-end speech quality assessment of narrow-band telephone networks and speech codecs, p. 1-21, Feb. 2001.

Recommendation ITU-T P. 863.1, Terminals and Subjective and Objective Assessment Methods: Methods for Objective and subjective assessment of speech quality, p. 1-30, Sep. 2014.

\* cited by examiner

METHODS AND SYSTEMS FOR EVALUATING VOICE CALL QUALITY

BACKGROUND

To offload voice traffic off of legacy third generation (3G) wireless networks, wireless carriers have introduced the capability of carrying voice traffic over high speed fourth generation (4G) and fifth generation (5G) networks, collectively referred to as voice over long term evolution (VoLTE) as well as the capability to carry or offload voice traffic only complementary private or public 802.11-based (e.g., Wi-Fi) networks.

In some circumstances, voice call performance over any of these access network technologies may suffer performance limitations, such as those caused by indoor environments, poor signal propagation or environments that are located remotely from a suitable base station or due to, for example, radio frequency requirements associated with a particular access technology. For example, in some wireless technologies, packet loss and jitter may be caused at least in part by cell congestion, radio link failure, IP network routing delays, queueing delay, buffer overflow on UE stack, and intra & inter radio access technology handoffs.

To adequately address these potential limitations, wireless service providers must be able to accurately and predictably ascertain the quality of the voice call services offered over their networks. Unfortunately, network operators are unable to capture or otherwise analyze actual end user voice packets due to technical, privacy, and legal limitations. Further, objectively determined or monitored network element operational statistics may not fully or accurately reflect end user perceived voice quality in any easily identifiable manner.

Automatic speech recognition (ASR) has been used to recognize text from spoken word. In general, ASR works by converting acoustic speech signals into a sequence of fixed-size acoustic vectors called "feature extraction."

Accordingly, a quantitative method of correlating network operational data to the actual end user perceived voice quality that leverages ASR techniques may be needed to effectively utilize available network resources to optimize voice call performance.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

Figure 1:
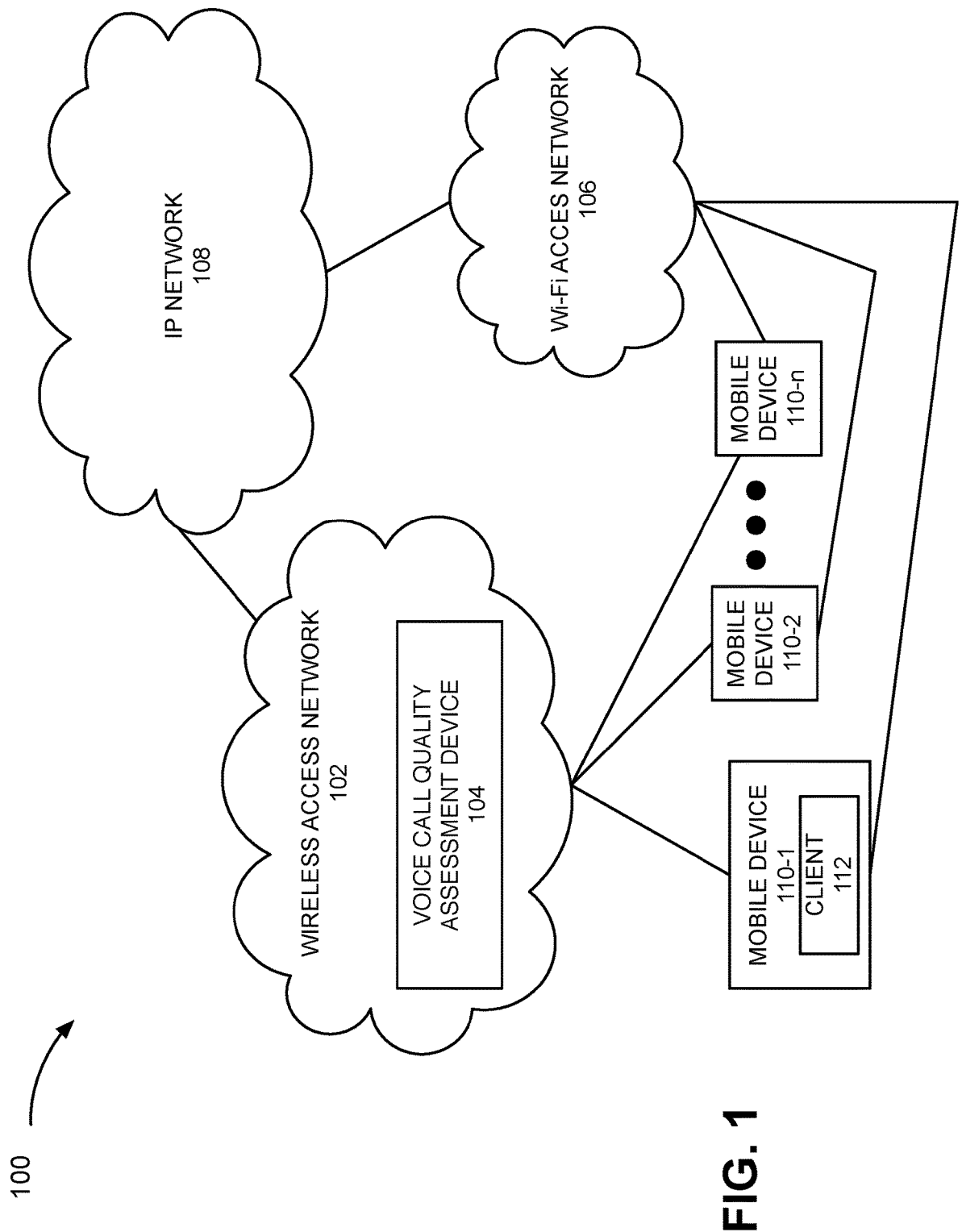
FIG. 1 is a diagram illustrating an exemplary environment for implementing the voice call quality assessment methodology described herein.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Systems and methods are described herein for evaluating voice call quality using artificial intelligence to generate a mean recognition score indicative of voice call quality.

According to some aspects of the embodiments described herein, a computing device receives multiple training data points. Each data point in the multiple training data points includes a traditionally derived voice call quality value and values for at least a subset of a set of key performance indicators (KPIs) related to voice call quality. The multiple data points may include measured data points from a 5G, Long Term Evolution (LTE) wireless network, or any other wireless network or access network as well as data points relating to the wireless (e.g., Wi-Fi) network or networks to which a mobile device is connected, which may be referred to as radio frequency (RF) data points. The network indicator data may represent one or more values of one or more network performance attributes of the network(s) to which a mobile device is connected. The RF data may indicate an RF quality (e.g., one or more values of one or more RF quality factors) of the network(s) to which a mobile device is connected.

In some cases, the traditional or legacy voice call quality value (e.g., the POLQA score) may be calculated by comparing a local recording of a speaker speaking into a local microphone and a remote recording of the speaker speaking over a network connection. A test subject listening to the remote recording may be asked to rank the goodness or understandability of the remote speaker.

Unfortunately, the above-described method of determining the voice quality value (e.g., the POLQA score) and other techniques that directly evaluate audio features are extremely cumbersome and costly to implement. For example, each evaluation requires professional hardware, such as high definition recorders, headphones, and playback devices, as well as significant human effort. Hence, direct evaluation of audio features is difficult to perform on a large-scale basis. Moreover, the direct evaluation of audio features does not analyze the root cause of poor voice quality and is thus unable to provide a mobile carrier with sufficient information that allows the mobile carrier to optimize one or more aspects of the mobile network in order to remedy the poor voice quality.

As described herein, an approximation or estimation of the voice call quality score may be determined by statistically, and autonomously, generating voice call quality scores for training calls using artificial intelligence based speech recognition and analyzing the resultant text to calculate a score representative of the quality of the call. The scores may then be correlated to the network conditions, thus enabling voice quality estimation based on subsequent collections of network conditions information. More specifically, the methods and systems described herein may facilitate voice quality assessment based on network indicator data and RF data measured by a network device, such as a mobile device or a combination of a mobile device and other network components, such as a base station, an access point, etc.

The methods and systems provide a quantified causal relationship between voice quality and deviation in network conditions and thereby allow a mobile carrier to more readily assess and remedy issues within the mobile network that have been demonstrably shown to result in poor voice quality.

In one embodiment, network indicator and/or RF features included in a set of training data may be initially evaluated to ascertain particular key performance indicators (KPIs) and/or combinations of KPIs that are most highly correlated to the voice call quality score. Using the identified KPIs as independent (predictor) variables and the known voice call quality score as the dependent (outcome) variables, a plurality of distinct regression analyses may be performed. Each regression result may be weighted based on the relative accuracy of each regression analysis. The distinct regression results are then combined and re-weighted to generate a final voice call quality algorithm that most closely approximates or predicts the voice call quality score for a given set of selected KPIs.

Once the voice call quality algorithm has been determined, the selected KPIs from testing data, such as live data, may be evaluated based on the final voice call quality algorithm to generate an estimated or predicted voice call quality score.

FIG. 1 is a diagram illustrating an exemplary environment 100 for implementing the call quality assessment methodology described herein. As shown, environment 100 includes, for example, a wireless access network 102 that includes a voice call quality assessment device 104, a Wi-Fi access network 106, an Internet Protocol (IP) network 108, and a plurality of mobile devices 110-1 to 110-n (individually referred to as mobile device 110, or collectively as mobile devices 110).

Environment 100 may be implemented to include wired, optical, and/or wireless connections among the devices and the networks illustrated, where appropriate. A connection may be direct or indirect and may involve one or more intermediary or additional devices not illustrated in FIG. 1.

Wireless access network 102 comprises components that facilitate Internet Protocol-based voice calls (e.g., non-circuit switched calls) between mobile devices 110. For example, wireless access network 102 may be a long term evolution (LTE) 4G wireless network or a 5G wireless network and may include one or more devices that are physical and/or logical entities interconnected via standardized interfaces. Wireless access network 102 provides wireless packet-switched services and wireless IP connectivity to user devices (such as mobile devices 110) to provide, for example, data, voice, and/or multimedia services. Although not depicted in FIG. 1, it should be understood that wireless access network 102 includes various components associated with providing wireless voice and data services, such as a plurality of access node devices (e.g., evolved node B (eNodeB) devices, gNodeB devices, etc.), as well as an evolved packet core (ePC) that includes a mobility management entity, serving and packet data network gateway devices, a home subscriber server, etc.

Voice call quality assessment device 104 may be implemented as a server or other computational device that receives data corresponding to a plurality of training voice calls, such as data originating at a mobile device 110 (referred to as mobile originated or MO data) and data received at a mobile device 110 (referred to as mobile terminated or MT data). In some embodiments, voice call quality assessment device 104 may be integrated with the EPC of the wireless access network 102, while in other embodiments, voice call quality assessment device 104 may be located within IP network 108.

Consistent with embodiments described herein, the training data may include KPIs relating to network and radio frequency (RF) measurements. In some embodiments, the KPI data may be received from respective mobile devices 110 or from network devices associated with the voice call with which the data is associated.

As described below, voice call quality assessment device 104 generates a voice quality model based on the received training data. The voice quality model may be optimized to generate AI-assisted voice call quality scores, but without the complexity or scalability issues associated with traditional scoring mechanisms. In one embodiment, a KPI selection methodology is utilized to identify the particular KPIs in the training data that most closely correlate to the voice call quality score (either individually, or in combination with one or more other KPIs). Once the set of correlated KPIs has been determined, a plurality of discrete statistical analyses may be performed using data that corresponds to the set of correlated KPIs and the voice call quality scores that correspond to those KPIs in an attempt to model or predict the voice call quality score for any given set of correlated KPIs.

As described below, in some embodiments, the plurality of discrete statistical analyses include a number of different multiple regression calculations that each result in independent regression results based on the selected training data (e.g., the given sets of KPIs and their corresponding voice call quality scores, the generation of which are described below). Because each regression calculation may result in a more or less accurate approximation of the data, each result may be weighted based on their individual relative accuracies, often referred to as the $R^2$ value for the regression, and cross validation result. Once each regression has been performed and weighted, the weighted regression results may be combined and an optimal weight for the set of regressions may be determined.

Once the optimal weight for the aggregate set of regressions is determined, an estimated voice call quality score may be confidently calculated for test or live data. The estimated voice call quality score may approximate the value of an AI-assisted voice call quality score that corresponds to the data, without the necessity for acoustic model comparisons or human intervention.

Consistent with embodiments described herein, the individual and aggregated regression calculations may be periodically updated or refined based on additional data sets to reflect potential changes in network conditions that may cause a modification in the correlation of network conditions to a suitable voice call quality score.

Wi-Fi access network 106 comprises a wireless local area network (WLAN) that operates to provide wireless access to a data connection from an Internet service provider (ISP). Although not shown in FIG. 1, Wi-Fi access network 106 may include a home gateway, access point, or router device that supports the wireless connection to mobile devices 110, as well as corresponding ISP devices (e.g., optical or coaxial terminals, head end components, etc.) configured to provide Internet access to connected mobile devices 110.

IP network 108 may include one or multiple networks of one or multiple types. For example, IP network 108 may include the Internet, the World Wide Web, an IP Multimedia Subsystem (IMS) network, a cloud network, a wide area network (WAN), a metropolitan area network (MAN), a service provider network, a private IP network, some other type of backend network, and so forth. IP network 108 may include, for example, an IMS network, which may provide data and multimedia services to mobile devices 110.

Each of mobile devices 110 includes computational and wireless communicative capabilities. Mobile devices 110 may be implemented as a wireless telephone, such as a smart phone, or alternatively, may be implemented as a non-wireless device, such as a laptop or tablet computing device. Mobile device 110 may or may not be operated by a user. According to an exemplary embodiment, mobile device 110 includes a voice call quality client tool 112 for providing a device interface to voice call quality assessment device 104, such as by providing recordings of acoustic signals either originated or terminated, as well as network or device-related call data, such as KPI data.

Figure 2:
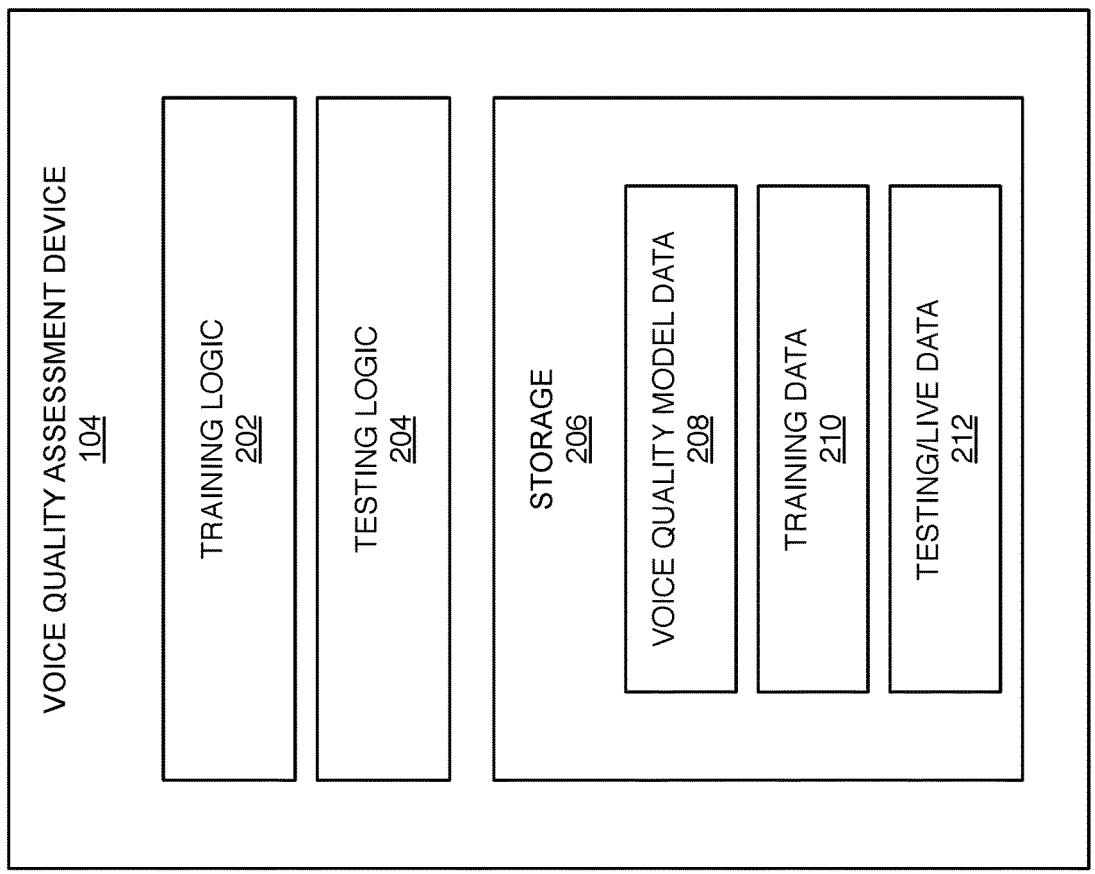
FIG. 2 is a block diagram of an exemplary embodiment of a voice call quality assessment device of FIG. 1.

FIG. 2 is a block diagram of an exemplary embodiment of voice call quality assessment device 104. As described above, voice call quality assessment device 104 is configured to assess voice quality of mobile telephones operating on one or more wireless networks, such as a 4G LTE, 5G, Wi-Fi, etc. As shown, voice call quality assessment device 104 may include, without limitation, training logic 202, testing logic 204, and storage 206 selectively and communicatively coupled to one another. Although components 202-206 are shown to be separate elements in FIG. 1, any of these components may be combined into fewer elements, such as into a single component, or divided into more components as may serve a particular implementation.

Additionally or alternatively, one or more of the components 202-206 may be omitted from voice call quality assessment device 104 and may be positioned external to or remote from voice call quality assessment device 104. For example, storage 206 may be located remotely relative to voice call quality assessment device 104 and may be communicatively coupled to voice call quality assessment device 104 via one or more network connections. Components 202-206 of voice call quality assessment device 104 may include or be otherwise implemented by one or more computing devices specifically configured to perform one or more of the operations described herein. In such implementations, voice call quality assessment device 104 may be referred to as a computing device-implemented system.

Storage 206 may store data generated and/or used by training logic 202 and/or testing logic 204. For example, storage 206 may comprise one or more database structures for storing voice quality model data 208 representative of a voice quality model built by training logic 202 and described in additional detail below. Storage 206 may also store training data 210 used by training logic 202 to build the voice call quality model, and testing/live data 212 used by testing logic 204 to generate a voice call quality score for mobile devices 110 once an initial voice call quality model has been derived. For example, as described above, training data 210 may include original acoustic signals and network-related KPI data for a plurality of sample or training calls and testing data 212 may include original acoustic signals and network-related KPI data for calls for which a predicted or estimated voice call quality score is to be determined. Storage 206 may store additional or alternative data as may serve a particular implementation. Data stored by storage 206 may be accessed by system 100 from any suitable source, including a source internal or external to voice call quality assessment device 104.

Training logic 202 may build the voice quality assessment model (also referred to as the voice quality assessment algorithm) that may be subsequently used to generate voice call quality scores that quantify a quality of voice communications for mobile devices at various locations or at various combinations of network conditions within a wireless (e.g., 3G, 4G, or 5G) or Wi-Fi network. In particular, as briefly described above, training logic 202 may include one or more artificial intelligence (AI) voice recognition modules configured to determine the recognizability of both original MO data and received MT data. Training logic 202 generates a mean recognition score (MRS) based on the recognized texts and passes the score to a regression engine that facilitate selection of most highly correlated KPIs and may perform a number of different multiple regression analyses and weight determinations to accurately model a voice call quality score outcome based on a given set of predictor KPIs.

Testing logic 204 may use the voice quality assessment model built by training logic 202 to derive a voice call quality score for a mobile device 110 coupled to wireless access network 104 and Wi-Fi access network 106. To this end, testing logic 204 may receive, from a mobile device 110 operating on wireless access network 104 and Wi-Fi access network 106, a test record that includes network indicator data and RF data both measured by the mobile device 110 while the mobile device 110 is at a location within the wireless and Wi-Fi networks 104/106. Testing logic 204 may then utilize the voice call quality model generated by training logic 202 to accurately predict a voice call quality score associated with the received call KPI data. In some embodiments, the predicted voice call quality score may be used by mobile devices 110 to determine when to handoff calls from wireless access network 104 to Wi-Fi access network 106 or vice-versa.

Figure 3:
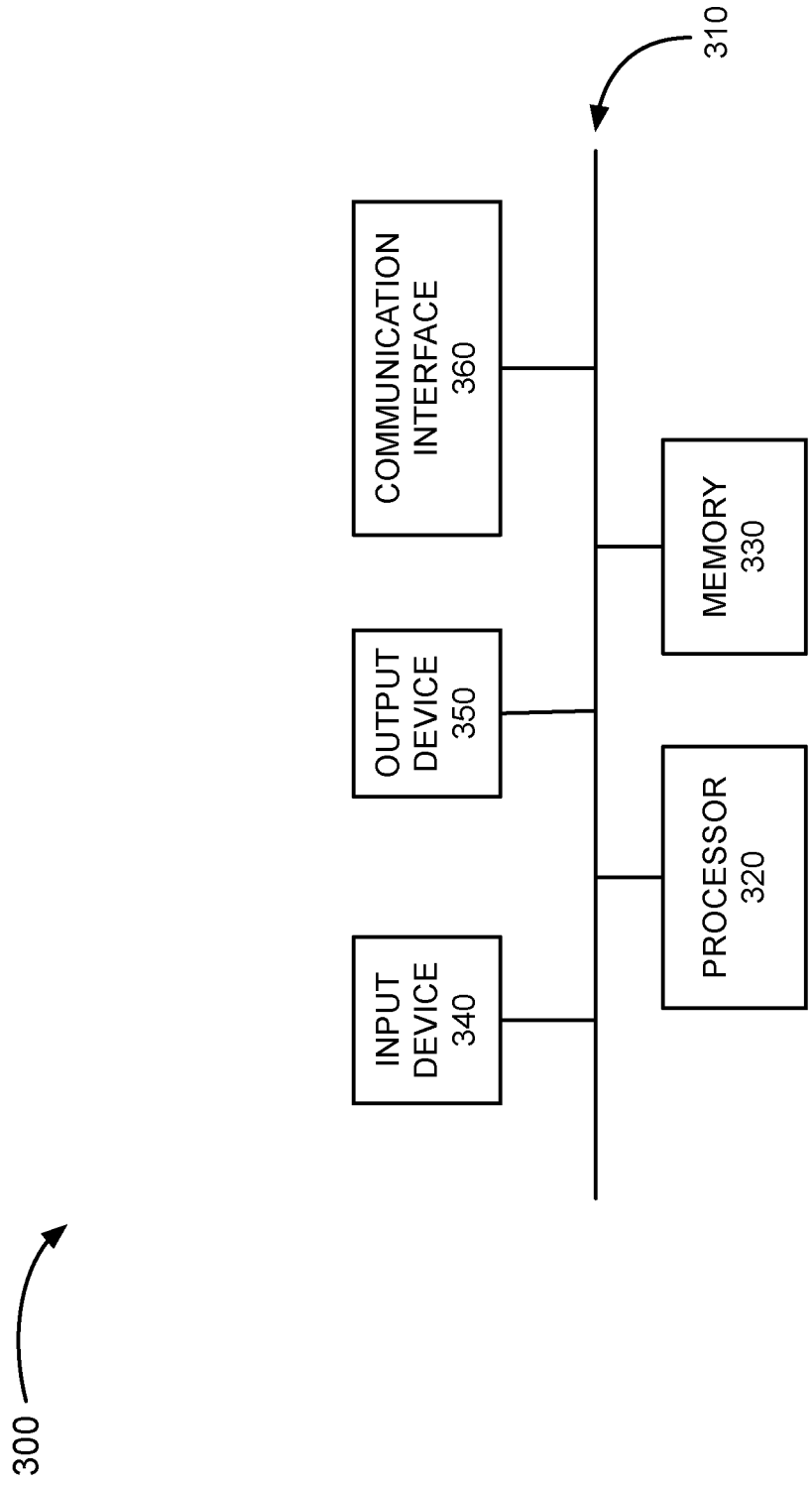
FIG. 3 is a diagram illustrating exemplary components of a device that may correspond to one or more of the devices illustrated herein.

FIG. 3 is a diagram illustrating exemplary components of a device 300. Device 300 may correspond, for example, to a component mobile device 110, voice call quality assessment device 104, mobile devices, or a component within wireless access network or Wi-Fi access network. Alternatively or additionally, such devices may include one or more devices 300 and/or one or more components of device 300.

Device 300 may include a bus 310, a processor 320, a memory 330, an input component 340, an output component 350, and a communication interface 360. Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
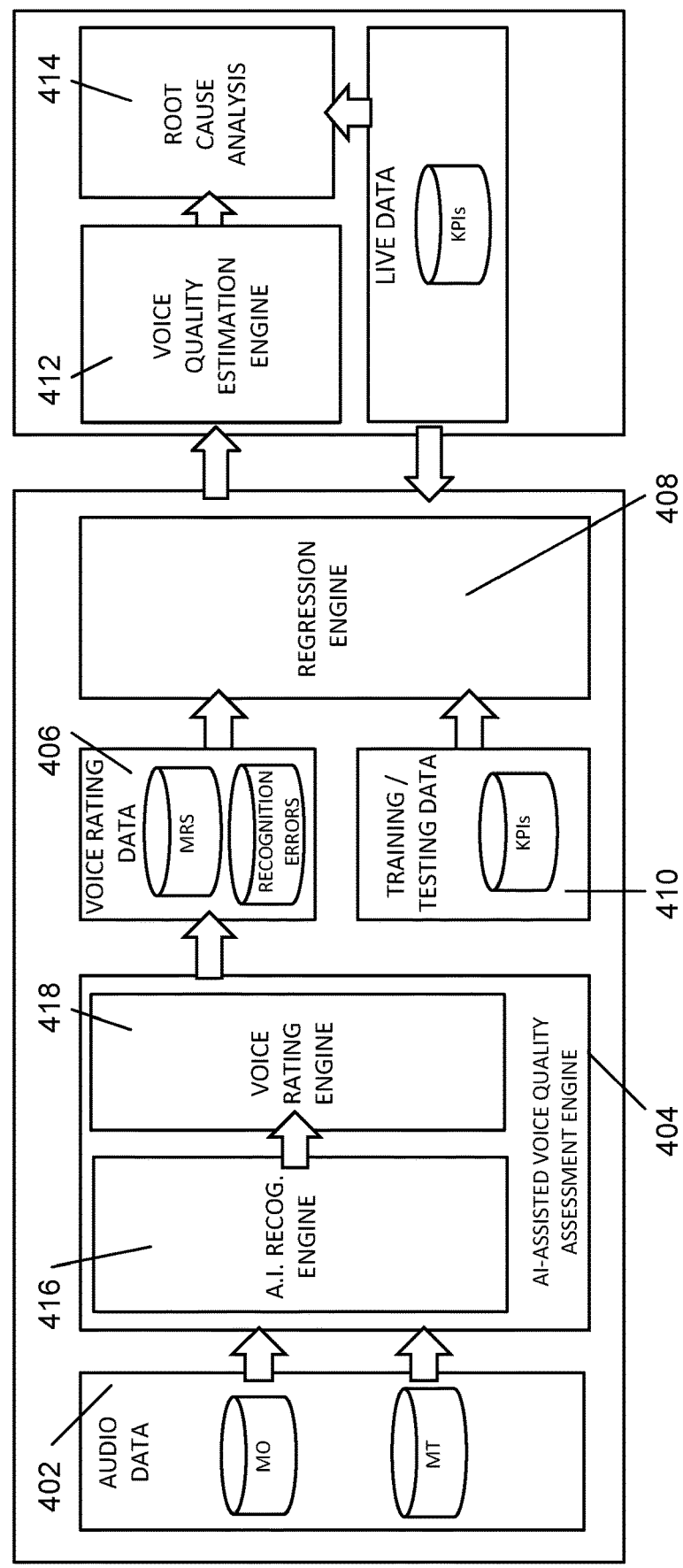
FIG. 4 is block diagram that conceptually illustrates components of the training logic of FIG. 2.

FIG. 4 is block diagram that conceptually illustrates the interrelationship between discrete components of training logic 202 and testing logic 204 in relation to elements of data stored in storage 206. As shown, training audio data 402, which includes both MO and MT acoustic audio clips recorded, generated, or captured by mobile devices 110 are provided to an artificial intelligence (AI) quality assessment engine 404 for analysis. Results from the AI-assisted quality assessment engine 404 may be stored in voice rating data 406 and further provided to regression engine 408 for analysis and correlation to training data KPIs received from training/testing data 410. As described below, regression engine 408 may perform KPI selection and regression analyses to determine a final AI-assisted voice quality algorithm. Using the AI-assisted voice quality algorithm, a voice quality estimation engine 412 may estimate a voice quality score for a provided set of live data KPIs. Furthermore, as a result of the KPI correlation, a root cause analysis engine 414 may determine the underlying cause or KPIs most impactful to the estimated voice quality score.

Consistent with embodiments described herein, training audio data 402 may be comprised of a number of standard recorded sentences, such as Harvard sentences (as presented in *IEEE Transactions on Audio and Electroacoustics*, vol. 17, pp. 227-46, 1969), ITU-T P.50 sentences, Haskins sentences, or custom text-to-sentence (TTS) engine (i.e., computer voice generated) sentences. Although each type of sentences may vary slightly in both phonemic make-up and predictability, the general concept is to provide a variety of sentence forms that approximate a range of human speech, and which are able to be positively and accurately compared to the recognized result to ascertain the accuracy of the speech recognition.

As shown in FIG. 4, AI-assisted quality assessment engine 404 may include an AI recognition engine 416 and a voice rating engine 418. Consistent with embodiments described herein, AI recognition engine 416 may perform automatic speech recognition (ASR) on the received MO and MT acoustic signals and generate corresponding output data for each signal. For example, AI recognition engine 416 may utilize machine learning principals to identify words and sentences presented in the provided acoustic signals. Examples of such AI-based ASR techniques include hidden Markov modeling (HMM), deep neural networks, such as LSTM recurrent neural networks (RNNs), and acoustic model+language model processing.

Commercially available ASR methodologies can typically recognize spoken utterances with an accuracy of between 94 and 99%. Such exceptional accuracy is misaligned with the realities of average human perception. Rather, human beings typically only recognize spoken utterances with on the order of an 80-90% accuracy. Accordingly, consistent with embodiments described herein, AI recognition engine 416 may be trained and/or configured to operate at an accuracy level more closely corresponding to an actual human accuracy level.

Voice rating engine 418 may receive as an input the recognized text from AI recognition engine 416 as well as the text of the known sentences for each of the MO and MT acoustic signals and generates a voice rating for each call. In particular, voice rating engine 418 may generate a mean recognition score (MRS) for each of the analyzed MO and MT signals. In some implementations, the MRS values for each of the MO and MT signals may be compared or otherwise combined to generate a net MRS indicative of the portion of the MRS attributable to the network conditions and thus potentially controllable by the network operator or service provider. The calculated MRS values as well as indications of the recognized errors are stored in voice rating data 406.

The MRS is a score or rating indicative of voice quality from a human speech recognition perspective, i.e., in terms of identified recognition errors. The MRS is calculated based upon analyzing AI recognized texts and takes into consideration the optimal alignment of recognized words from MO acoustic signals with recognized words from network degraded MT acoustic signals. Recognition errors are produced when the AI recognition engine 416 misses or incorrectly recognizes a word based on 3 types of errors: substitution, or mismatch, in which the wrong term is recognized; deletion, in which a term is skipped or otherwise ignored; and insertion, in which an additional term not included in the original text is recognized.

Both "insertion" and "deletion" errors may be classified as "gap" errors. Based upon a general speaking speed of about 2-3 words per second, 4 levels of gap errors may be identified: extra-small recognition gap (XSRG), in which about 1-2 consecutive words are missed or incorrectly recognized; small recognition gap (SRG), in which about 3-6 consecutive words are missed or incorrectly recognized; middle recognition gap (MRG), in which about 7-12 consecutive words are missed or incorrectly recognized; and large recognition gap (LRG), in which about 13 or more consecutive words are missed or incorrectly recognized.

Consistent with embodiments described herein, the MRS for each of the MO and MT acoustic signals is based on a number of different criteria, including 1) the amount of recognized text, 2) the length of consecutive unrecognized or misrecognized text, and 3) the distribution of the recognition errors within the text to be recognized. More specifically, a higher percentage of accurately recognized text, shorter lengths of unrecognized text (in terms of either duration or term count), and more distributed recognition errors all contribute to higher MRS scores, while lower accuracy percentages, longer lengths of unrecognized text, and less distributed recognition errors all contribute to lower MRS scores.

To reflect these criteria, the MRS scores for each of the MO and MT acoustic samples may be calculated using one or more sub-scores. Exemplary sub-scores include a dynamic time warping score (DTWS) and a maximum entropy score (MES). The impact of each of these sub-scores may be weighted to optimize the overall MRS score's correlation to actual human recognition. Such a weighting may be represented as:

$$\text{MRS} = w_1 \cdot \text{DTWS} + w_2 \cdot \text{MES}, \quad (1)$$

where $w_1$ and $w_2$ are constant weights reflecting the desired impact of each sub-score.

Dynamic Time Warping (DTW) is a technique for comparing or measuring the similarity between two time sequences. In this case, the two time sequences correspond to the original text and the recognized text, for either the MO or MT signal. In DTW, a numerical representation of the "closeness" of any two points in the two time sequences is determined and plotted in a distance matrix. The best match between the two time series may be determined by examining the values in the distance matrix.

Consistent with embodiments described herein, the text as recognized by AI recognition engine 416 is compared to the original known text (e.g., the Harvard sentence used, the TTS input, etc.) and values are assigned based on the accuracy or type of recognition error, which may collectively be referred to as recognition events. Weights or constants may be assigned to each type of recognition event to adjust for their relative importance to the MRS. The result may be normalized to provide a value between zero and one. Such a calculation may be represented by the following:

$$DTWS = \max\left(\frac{c_1 \cdot M - c_2 \cdot S - c_3 \cdot D - c_4 \cdot I}{c_1 \cdot (M + S + D + I)}, 0\right), \quad (2)$$

where M is a count of the number of correct matches, S is a count of the number of substitution errors, D is a count of the number of deletion errors (D), I is a count of the number of insertion errors, and $c_1$-$c_4$ are the weights for each type of recognition event. Based on the above equation, it can be seen that constant $c_1$ reflects a bonus weighting assigned to correct matches, while constants $c_2$-$c_4$ reflect penalty weights for each of the noted recognition errors.

In one example of a set of weightings that heavily favor matches over errors (referred to below as set 1), $c_1$ is set to 5, $c_2$ is set to 2 and $c_3$ and $c_4$ are each set to 6. In another, more neutral example (referred to below as set 2), each of $c_1$-$c_4$ are set to a common value of 1.

Consider the following two exemplary text sequences and the corresponding recognition values for each example weighting set:

| Original Text: | the | lazy | cow | lay | in | the | cool | grass |
|---|---|---|---|---|---|---|---|---|
| Recognized Text: | the | lady | call | lay | in | | cool | glass |
| Recog. Event. | M | S | S | M | M | D | M | S |
| Weights (set 1) | 5 | 2 | 2 | 5 | 5 | 6 | 5 | 2 |
| Weights (set 2) | 1 | 1 | 1 | 1 | 1 | 1 | 1 | 1 |

In the above examples, a raw DTWS may be calculated by summing the weights for each of the matches and subtracting the weights for each of the errors. Accordingly, for weight set 1, the raw DTWS may be calculated as:

$$5-2-2+5+5-6+5-2=8,$$

while a normalized DTWS may be calculated as:

$$DTWS = \max\left(\frac{5 \cdot 4 - 2 \cdot 3 - 6 \cdot 1 - 6 \cdot 0}{5 \cdot (8)}, 0\right)$$

$$= \max\left(\frac{8}{40}, 0\right)$$

$$= 0.2$$

Similarly, for weight set 2, the raw DTWS may be calculated as:

$$1-1-1+1+1-1+1+1=2,$$

And the normalized DTWS for weight set 2 may be calculated as:

$$DTWS = \max\left(\frac{1 \cdot 4 - 1 \cdot 3 - 1 \cdot 1 - 1 \cdot 0}{1 \cdot (8)}, 0\right)$$

$$= \max\left(\frac{0}{8}, 0\right)$$

$$= 0$$

As shown, the score for weight set 1 more heavily favors matches over errors, while the neutral weighting for weight set 2 essentially reduces the DTWS score to its lowest value of 0 based on the similar number of matches (4) to errors (4).

Based on the calculation of the DTWS shown above, it can be seen that criterion 1 can be satisfied, however this score does not address criteria 2 and 3 which reflect the length of consecutive errors and the distribution of the errors within the recognized text. To address these criteria, the system described herein includes an additional sub-score reflecting the entropy or the amount of disorder in the recognized text, referred to as the maximum entropy score (YMS). As described below, the MES measures the voice quality depending on the distribution of recognition errors. The more uniformly distributed the recognition errors, the higher the MES.

Consistent with embodiments described herein, the IVIES may be represented as:

$$MES = \frac{-\Sigma_i^N \, Pr(x_i) \, \log(Pr(x_i))}{\log N}, \quad (3)$$

where i represents a count of the number of the recognition error (S, D, or I), N represents a count of the total number of recognition errors plus one and $x_i$ represents the distance (in number of words) between the $i^{th}$ error and the $(i+1)^{th}$ error and includes values for the distance between the beginning of the recognized text to the first error and the last error to the end of the recognized text, respectively, which are referred to generally as "boundaries". For adjacent or "close" errors (e.g., recognition errors in consecutive words) or for errors adjacent to a boundary, the value of $x_i$ is set equal to zero for consistency. $Pr(x_i)$ represents the probability of a particular value of $x_i$.

Accordingly, for the above example, N is 4+1=5, the distance, $x_1$, between the beginning of the sentence and the first substitution error (lady for lazy) is 1, the distance, $x_2$, between the first substitution error and the second substitution error (call for cow) is 0, the distance, $x_3$, between the second substitution error and the second deletion error (blank for the) is 2, the distance, $x_4$, between the second deletion error and the third substitution error (glass for grass) is 1, and the distance, $x_5$, between the third substitution error and the end of the sentence is 0. Accordingly, $Pr(x_i)$ may be computed as $$\frac{x_i}{\Sigma_i x_i},$$

where $\Sigma_i x_i$ represents the sum of all $x_i$'s, which is 4 for this example. Thus, $Pr(x_1)$ is ½=0.250, $Pr(x_2)$ is 0/4=0.000, $Pr(x_3)$ is 2/4=0.500, $Pr(x_4)$ is ¼=0.250, and $Pr(x_5)$ is 0/4=0. Using this information, the IVIES for the above example may be calculated as:

$$MES = \frac{-\Sigma_i^N \, Pr(x_i) \, \log(Pr(x_i))}{\log N}$$
$$= \frac{-(-0.151 - 0 - 0.151 - 0.151 - 0)}{0.699}$$
$$= \frac{0.452}{0.699}$$
$$= 0.646$$

By way of comparison, consider the following, less distributed example:

Original Text: the butterfly flew over the green green grass toward the lazy river Recognized Text: the button flew over _ _ _ glass toward the lazy river Recog. Event. M S M M D D D S M M M M For this example, N is 6, $x_1$=1, $x_2$=2, $x_3$=0, $x_4$=0, $x_5$=0, and $x_6$=4 Accordingly, $Pr(x_1)$ is 1/7=0.143, $Pr(x_2)$ is 2/7=0.286, $Pr(x_3)$ is 0/7=0, $Pr(x_4)$ is 0/7=0, $Pr(x_5)$ is 0/7=0, and $Pr(x_6)$ is 4/7=0.571.

Using this information, the IVIES for the above example may be calculated as:

$$MES = \frac{-\Sigma_i^N \, Pr(x_i) \, \log(Pr(x_i))}{\log N}$$
$$= \frac{-(-0.121 - 0.155 - 0 - 0 - 0 - 0.139)}{0.778}$$
$$= \frac{0.415}{0.778}$$
$$= 0.533$$

It should be understood that the above equations and calculations are exemplary only and that any suitable combination of statistical scoring methodologies may be used, consistent with embodiments described herein. Similarly, the weightings applied to the respective recognition events and the respective sub-scores are also exemplary.

Returning to FIG. 4, voice rating engine 418 may identify the portion of the MRS that is based on network degradation by comparing the calculated MRS value for each MT sample against the MRS value of its corresponding MO sample. The result of such a comparison may be referred to as the MRS delta and may also be stored in voice rating data 406.

The values for MRS and MRS delta along with KPI data corresponding to each call are provided to regression engine 408. Using this information, regression engine 408 derives the final AI-assisted voice call quality algorithm.

Figure 5:
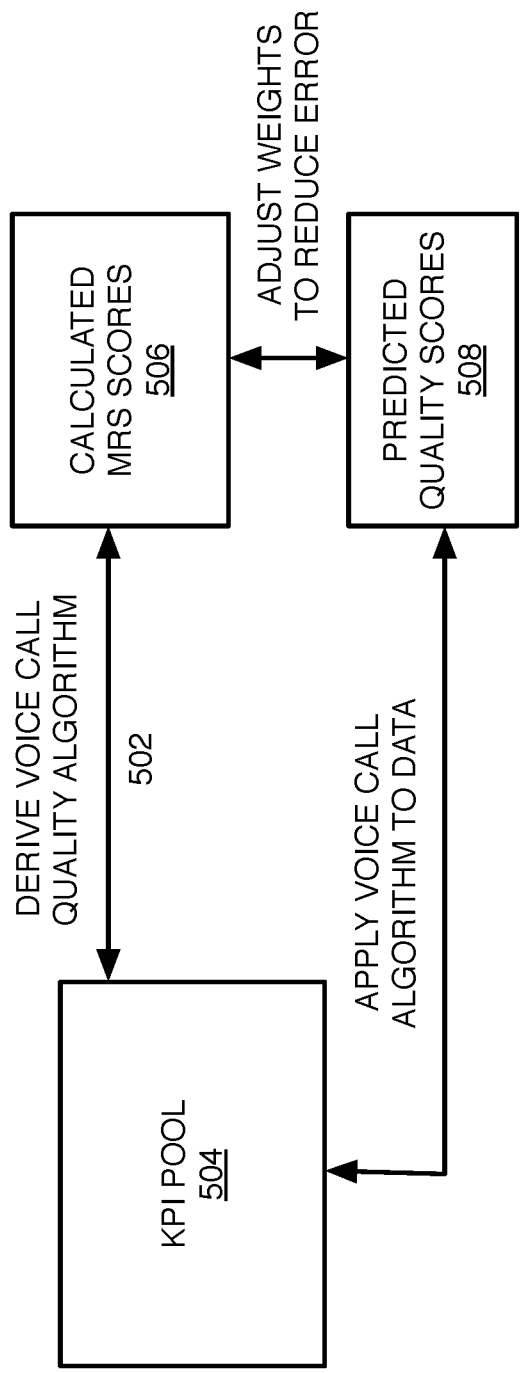
FIG. 5 is a process flow diagram that conceptually illustrates an exemplary operation of training logic and testing logic of FIG. 2.

FIG. 5 is a general process flow diagram that conceptually illustrates an exemplary operation of regression engine 408. As shown, the final AI-assisted voice call quality algorithm is derived (502) based on a pool of available KPI values 504 retrieved from training/testing data 410 and the set of MRS scores 506 calculated by voice rating engine 406.

More specifically, regression engine 408 may initially perform feature selection on the pool of KPI values stored in training/testing data 410 to determine the most correlative KPI values to the MRS score and/or the MRS delta score. In one implementation, the correlation of each possible KPI (e.g., each KPI included in the training/testing data 410) to the corresponding training data MRS/MRS delta score) may be determined using a linear correlation technique, such as a Pearson correlation or a ranked Pearson correlation, which is known as a Spearman correlation. In other implementations, a nonlinear correlation technique, such as a mutual information technique may be used. The correlation analysis ascertains the extent to which a modification of one variable affects another, with a perfect positive correlation (e.g., an increase in variable A directly correlates to an increase in variable B) being indicated by a value of 1, a perfect negative correlation (e.g., an increase in variable A directly correlates to a decrease in variable B) being indicated by a value of −1 and a lack of correlation being indicated by a value of 0. A Spearman correlation is sometimes advantageous relative to a general Pearson correlation in that it is less sensitive to statistical outliers by virtue of the rankings of the data being used to perform the correlation analysis.

In other embodiments, a decision tree learning methodology is used to determine the most correlative KPIs by leveraging gini impurity or information gain to determine the most significant KPIs.

In an embodiment, such a KPI selection process may determine that the most correlative KPIs for evaluating call quality include packet loss rate, jitter, latency, reference signal received power (RSRP), reference signal received quality (RSRQ), signal-to-interference-plus-noise ratio (SINR), physical resource block (PRB) utilization, and radio link control (RLC) failure status. It is to be understood that other KPI values may be used as well.

Once the most correlative KPIs have been determined, multiple regression analyses are performed using some or all of the set of selected KPIs to derive the final AI-assisted voice call quality algorithm. In some embodiments, the components of the voice call quality algorithm are tuned or weighted so as to bring the mean error rate of any calculated or predicted call quality score 508 to within about 0-10% of the traditional call quality score and preferable within about 5%. As depicted in FIG. 5, the derivation and tuning of the voice call quality algorithm are fundamentally recursive in that the generated algorithm may be continually or periodically adjusted to reflect either additional data, or to reflect changes in the permissible mean error rate.

Figure 6:
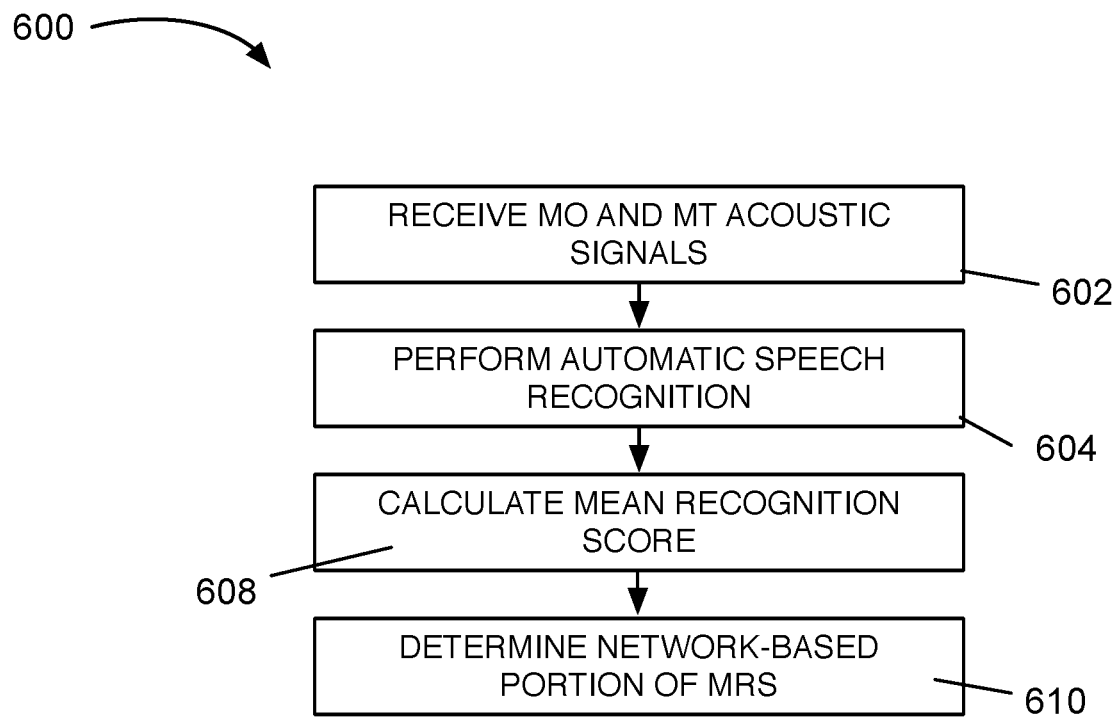
FIG. 6 is a flow diagram illustrating an exemplary process for determining an AI-assisted voice quality score consistent with implementations described herein.

FIG. 6 is a flow diagram illustrating an exemplary process 600 for determining an AI-assisted voice quality score consistent with implementations described herein. Process 600 may be implemented by voice call quality assessment device 104, and more particularly by AI recognition engine 416 and voice rating engine 418. As shown, processing 600 may begin by receiving acoustic signals from both originating (MO) and terminating (MT) mobile devices along with corresponding reference text (block 602). For example, AI recognition engine 416 may receive acoustic call recordings from mobile devices 110, or from a repository of stored call information stored in training audio data 402. By receiving and analyzing both the originating mobile device signal and the receiving mobile device signal, differences therebetween may be used to account for the impact of network conditions, or degradations. As described above, the content of the acoustic signals may be based on standardized sentence databases, such as Harvard sentences, etc., or may be custom formed using a TTS engine or the like.

The text content of both the MO and MT acoustic signals are then recognized (block 604). For example, AI recognition engine 416 may employ any of a number of AI-based automatic speech recognition (ASR) techniques or a combination thereof to determine a content of the received spoken words. Exemplary ASR techniques include hidden Markov modeling (HMM), deep neural networks, such as LSTM recurrent neural networks (RNNs), and acoustic model+language model processing. As described above, in some implementations, it may be advantageous to limit or reduce the accuracy of the ASR to reflect likely human comprehension, with the goal of approximating human understanding, rather than maximizing recognition accuracy. To this end, the ASR technique(s) employed may be modified to reduce or limit the accuracy of the speech recognition.

A recognition score is then determined for each acoustic signal by comparing the content of the speech recognition to the original reference text (block 608). For example, voice rating engine 418 may compute a mean recognition score (MRS) based on the comparison. As described above, an exemplary mean recognition score is computed to reflect both accuracy of the recognition (number of words matched) as well as the distribution of the errors observed. Accordingly, in the examples described above, the MRS is calculated to include two sub-scores, one based on accuracy, and the other based on distribution. The relative weights of each sub-score may be optimized to most closely reflect likely human understandability. As also described above, in one embodiment, the sub-scores may include a dynamic time warping score (DTWS) and a maximum entropy score (MES), with the total MRS being based on relative weights for each of these scores, as set forth above in equation (1).

A network-based component of the MRS, referred to above as the MRS delta, is determined by comparing the MRS for the MO acoustic signal against the MRS of the MT acoustic signal (block 610). For example, voice rating engine 418 may subtract the value of the MT MRS from the value of the MO MRS to ascertain the portion of the score attributable to network conditions.

Figure 7:
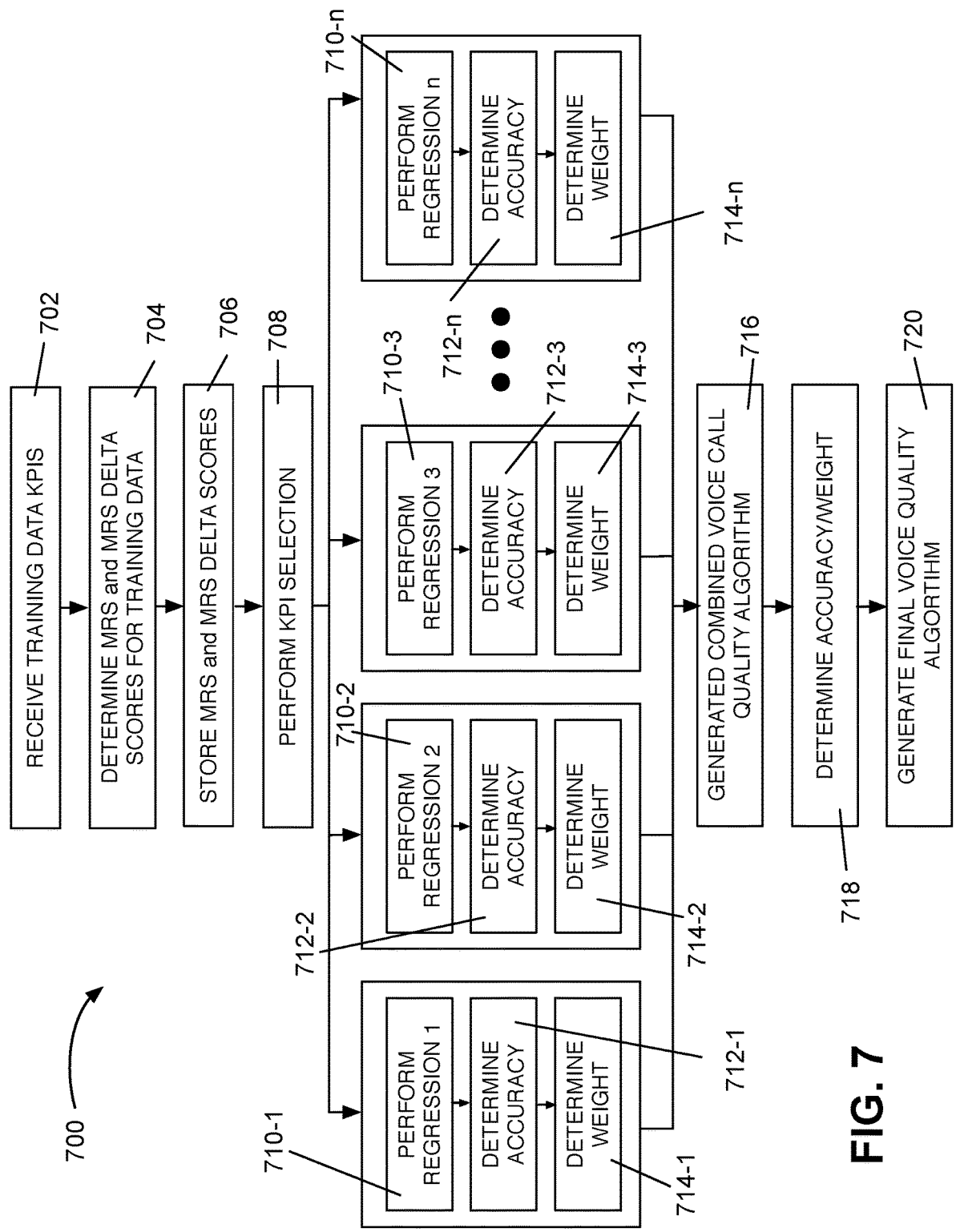
FIG. 7 is a flow diagram illustrating an exemplary process for determining voice call quality consistent with embodiments described herein.

FIG. 7 is a flow diagram illustrating an exemplary process 700 for determining call quality consistent with embodiments described herein. In one implementation, process 700 may be implemented by a dedicated voice call quality assessment device 104. In another implementation, process 700 may be implemented by a component of wireless access network 102 that incorporates the features of voice call quality assessment device 104 or in conjunction with one or more other devices in network environment 100.

Referring to FIG. 7, process 700 may include receiving and storing training data, such as network and RF KPI data, for a plurality of sample calls (block 70). For example, training logic 202 may receive acoustic call signals and related KPI data, e.g., from a client application executing on mobile devices 110. At block 704, an MRS voice call quality scores may be determined based on the call data. For example, the AI-assisted voice call quality scores (e.g., the MRS scores or MRS delta scores) may be determined in the manner described in detail above.

In some embodiments, the AI-assisted voice call quality scores may be determined outside of voice call quality assessment device 104, with voice call quality assessment device 104 merely receiving the resultant scores that correspond to the received KPI data. In any event, at block 706, the AI-assisted voice call quality score is stored for subsequent use by voice call quality assessment device 104.

Next, using the stored KPI data and the corresponding AI-assisted voice call quality scores, KPI selection is performed (block 708). For example, as briefly described above, training logic 202 may calculate correlation indices (e.g., correlation coefficients) or mutual information indices for each KPI in relation to the calculated voice call quality scores. For example, a Spearman correlation may be performed to identify the most correlative KPIs. More specifically, a pair-wise relationship of voice call quality scores and KPIs may be visualized. The KPIs showing high impact on the voice call quality score may be selected as independent variable candidates.

In an exemplary embodiment, the most correlative KPIs may be selected for inclusion into the predicted voice call quality score algorithm generation process. In particular, a number of different KPIs may be included with varying levels of resulting complexity. As set forth above, exemplary KPIs selected for inclusion may include packet loss rate, jitter, latency, RSRP, RSRQ, SINR, PRB utilization, and RLC failure status, although others are possible.

At blocks 710-1 to 710-$n$, the selected KPIs and the AI-assisted voice call quality scores are subjected to a plurality of different regression analyses. For example, training logic 202 may perform a gradient boosting regression, such as the XGBoost regression; a reinforced learning regression, a neural network-based regression, a support vector machine regression, a nearest neighbor regression, etc. It is to be understood that additional, fewer or different regressions can be used, such as a linear regression, a second or third order polynomial regressions, a lasso regression, a ridge regression, an elastic regression, or a generalized additive model regression.

Still referring to FIG. 7, once each individual regression has been performed, the accuracy of each regression is determined (blocks 712-1 to 712-$n$). For example, training logic 202 may calculate a mean error rate for each regression to determine the variance of the predicted voice call quality scores relative to the AI-assisted voice call quality score (e.g., the MRS score or MRS delta score) determined by in the manner described above. In an alternative implementation, the accuracy of each regression may be determined using a least squares fit analysis. Using the accuracy determinations for each regression, weights are applied to each regression result, with the aggregate weights totaling to 1, such that combination of all of the resulting scores when their respective weights are applied will approximate the voice call quality score block 714-1 to 714-n).

Once individual weights have been determined for each regression result, the results are combined to generate a combined estimated voice call quality algorithm (block 716). Next, an accuracy calculation is performed on the combined estimated voice call quality algorithm to calculate a weight (block 718) for applying to the combined score to allow it to best approximate the AI-assisted voice call quality score (e.g., the MRS score). For example, the weight may be selected to result in estimated voice call quality scores having a mean error rate that is within approximately 0-10% of the AI-assisted calculated voice call quality scores (e.g., the MRS or MRS delta scores). Using the determined weight, a final combined estimated voice call quality algorithm may be generated (block 720).

In one embodiment, Quadratic Programming is used to determine the optimum weight. For example, assume that for a given voice call quality assessment we have 7 regression fitted series: Y1, Y2, . . . Y7, and assume that Y is the AI-assisted measured voice call quality score. Quadratic Programming may be performed to solve for the weight that minimize the square sum of the errors.

Figure 8:
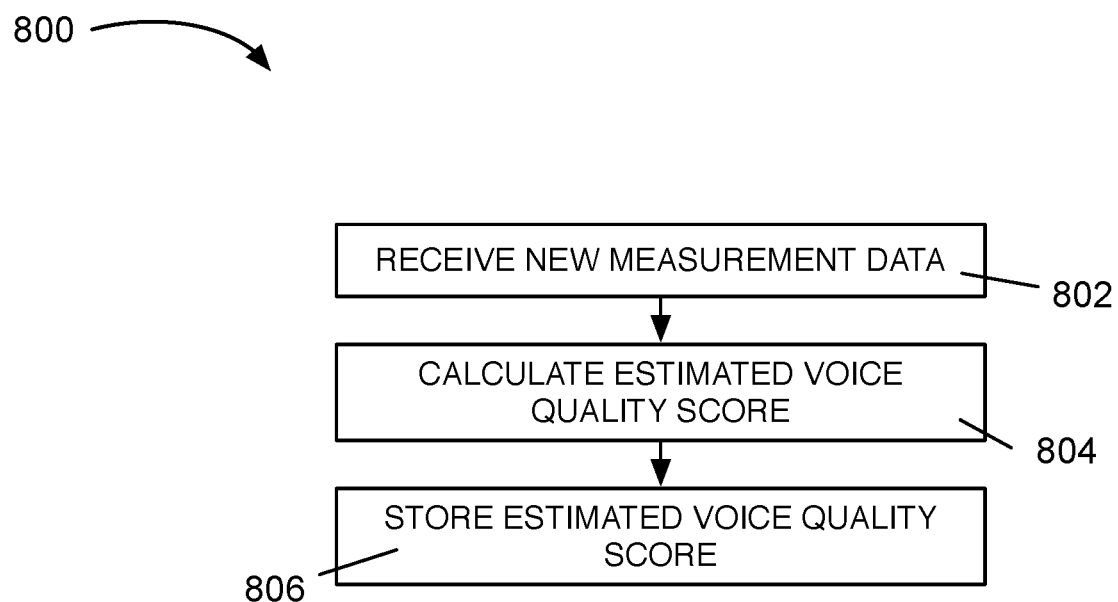
FIG. 8 is a flow diagram illustrating an exemplary process for determining an estimated voice call quality score.

FIG. 8 is a flow diagram illustrating an exemplary process 800 for determining an estimated voice call quality score using the combined estimated voice call quality algorithm derived in the manner described in relation to FIG. 7. In one implementation, process 800 may be implemented by voice call quality assessment device 104, such as testing logic 204. In another implementation, process 800 may be implemented by a component of wireless access network 102 or, alternatively, a component or application executing on mobile device 110.

As shown in FIG. 8, process 800 begins when a new measurement is received (block 802). For example, testing logic 204 may receive a set of KPIs relating to a voice call from/to mobile device 110. In block 804, selected ones in the received set of KPIs are inserted into the combined estimated voice call quality algorithm to generate an estimated voice call quality score. The estimated voice call quality score may be stored (block 806). For example, testing logic 204 may store the estimated voice call quality score in storage 206 for diagnostic or evaluative purposes. In some embodiments, an indication of the estimated voice call quality score is output to, for example, the mobile device 110 from which the set of KPIs on which the score is based is received. In other embodiments, an indication of the estimated voice call quality score may be used as a basis for determining whether to handoff a voice call to a different access network 102/106, e.g., Wi-Fi, LTE, 3G, etc.

In some embodiments, testing logic 204 may provide, using output component 350 of testing logic 204 or another output device, such as mobile device 110, an indication of one or more of the input KPIs that most impacted the estimated voice call quality score. In this manner, voice call quality assessment device 104 may inform users regarding what KPI(s) to change or address to improve the predicted voice call quality score in a case where the predicted voice call quality score is insufficient. Voice call quality assessment device 104 may be provided with a cost (financial, resource-based, etc.) for changing the KPI(s), and may indicate, based on the cost, which KPI(s) should be changed to cause a greatest increase in voice call quality per unit of currency (e.g., dollar, asset) spent.

The foregoing description of embodiments provides illustration but is not intended to be exhaustive or to limit the embodiments to the precise form disclosed. Accordingly, modifications to the embodiments described herein may be possible.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," and "the" does not, without further constraints, preclude the existence of additional identical elements in the process, method, article, or apparatus that comprises the element and are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks or process steps have been described with regard to the processes illustrated in FIGS. 5, 6, 7, and 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 320, etc.), or a combination of hardware and software. The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 320) of a computational device. A non-transitory storage medium includes one or more of the storage mediums described in relation to memory/storage 330.

No element, act, or instruction described in the present application should be construed as critical or essential to the embodiments described herein unless explicitly described as such.

What is claimed is:

1. A method for determining and estimating voice call quality, comprising:
   receiving, at a computing device, training data for a plurality of voice calls, wherein the training data for each voice call comprises at least an originating device acoustic signal, a receiving device acoustic signal, reference text, and values for a plurality of key performance indicators (KPIs) for a network over which the voice calls are conducted;
   performing, at the computing device, automatic speech recognition, for each of the plurality of voice calls, to generate recognized text for both the originating device acoustic signal and the receiving device acoustic signal;
   comparing, at the computing device, for each of the plurality of voice calls, the recognized text for both the originating device acoustic signal and the receiving device acoustic signal to the reference text to identified recognition errors;
   determining, at the computing device, for each of the plurality of voice calls, a voice call quality score for each of the originating device acoustic signal and the receiving device acoustic signal based on the automatic speech recognition and the identified recognition errors,
   determining, for each of the plurality of voice calls, a portion of the voice call quality score based on conditions of the network; and
   determining, for each KPI of the plurality of KPIs and using the training data, a correlation between the KPI and the portion of the voice call quality score based on conditions of the network.

2. The method of claim 1, wherein the voice call quality score includes a first sub-score based on the accuracy of the automatic speech recognition and a second sub-score based on the distribution of identified recognition errors.

3. The method of claim 2, wherein the first sub-score and the second sub-score are assigned first and second weights.

4. The method of claim 2, wherein the first sub-score is based on a count of correct matches and a count of the identified recognition errors for each of the originating device and receiving device acoustic signals.

5. The method of claim 4, wherein the identified recognition errors further include identified substitution errors, identified deletion errors, or identified insertion errors.

6. The method of claim 5, wherein the first sub-score is calculated as:

$$\max\left(\frac{c_1 \cdot M - c_2 \cdot S - c_3 \cdot D - c_4 \cdot I}{c_1 \cdot (M + S + D + I)}, 0\right),$$

where M is a count of the number of correct matches, S is a count of the number of substitution errors, D is a count of the number of deletion errors (D), I is a count of the number of insertion errors, and $c_1$-$c_4$ are corresponding weights.

7. The method of claim 2, wherein the second sub-score is based on a distribution of the identified recognition errors within the recognized text and is calculated as:

$$\frac{-\Sigma_i^N \Pr(x_i) \log(\Pr(x_i))}{\log N},$$

where i represents the number of the recognition error in the recognized text, N represents a total count of recognition errors in the recognized text plus one, $x_i$ represents the distance between the $i^{th}$ error and the $(i+1)^{th}$ error including distances between the beginning and ending of the recognized text to a closest adjacent error, and $\Pr(x_i)$ represents the probability of a particular value of $x_i$.

8. The method of claim 1, further comprising:
   selecting a subset of the plurality of KPIs;
   performing a plurality of discrete regression analyses based on the subsets of the plurality of KPIs and the voice call quality values to generate a plurality of regression results;
   determining an accuracy for each of the plurality of regression results;
   assigning weights to each of the plurality of regression results based on the determined accuracies; and
   combining the plurality of regression results using the assigned weights to generate a final combined estimated voice call quality algorithm that accurately predicts the voice call quality value based on values for the selected subset of the plurality of KPIs.

9. The method of claim 8, further comprising:
   receiving new KPI values for the selected subset of the plurality of KPIs;

determining the estimated voice call quality value based on the combined estimated voice call quality algorithm and the new KPI values; and outputting an indication of the estimated voice call quality value.

10. The method of claim 8, wherein the selected subset of the plurality of KPIs comprises at least two KPIs.

11. The method of claim 8, wherein the selected subset of the plurality of KPIs are selected from a list comprising: packet loss rate, jitter, latency, reference signal received power (RSRP), reference signal received quality (RSRQ), signal-to-interference-plus-noise ratio (SINR), physical resource block (PRB) utilization, and radio link control (RLC) failure status based on the correlation of each KPI to the voice call quality value.

12. A device comprising:
a communication interface;
a memory, wherein the memory stores instructions; and
a processor, wherein the processor executes the instructions to:
receive training data for a plurality of voice calls, wherein the training data for each voice call comprises at least an originating device acoustic signal, a receiving device acoustic signal, reference text, and values for a plurality of key performance indicators (KPIs) for a network over which the voice calls are conducted;
perform automatic speech recognition, for each of the plurality of voice calls, to generate recognized text for both the originating device acoustic signal and the receiving device acoustic signal;
compare, for each of the plurality of voice calls, the recognized text for both the originating device acoustic signal and the receiving device acoustic signal to the reference text to identified recognition errors;
determine, for each of the plurality of voice calls, a voice call quality score for each of the originating device acoustic signal and the receiving device acoustic signal based on the automatic speech recognition and the identified recognition errors,
determine, for each of the plurality of voice calls, a portion of the voice call quality score based on conditions of the network; and
determine, for each KPI of the plurality of KPIs and using the training data, a correlation between the KPI and the portion of the voice call quality score based on conditions of the network.

13. The device of claim 12, wherein the voice call quality score includes a first sub-score based on the accuracy of the automatic speech recognition and a second sub-score based on the distribution of identified recognition errors.

14. The device of claim 13, wherein the first sub-score and the second sub-score are assigned first and second weights to optimize the voice call quality score.

15. The device of claim 13, wherein the first sub-score is based on a number of correct matches and a number of recognition errors for each of the originating device and receiving device acoustic signals.

16. The device of claim 15, wherein the identified recognition errors further include identified substitution errors, identified deletion errors, and identified insertion errors.

17. The device of claim 16, wherein the first sub-score is calculated as:

$$\max\left(\frac{c_1 \cdot M - c_2 \cdot S - c_3 \cdot D - c_4 \cdot I}{c_1 \cdot (M + S + D + I)}, 0\right),$$

where M is a count of the number of correct matches, S is a count of the number of substitution errors, D is a count of the number of deletion errors (D), I is a count of the number of insertion errors, and $c_1$-$c_4$ are corresponding weights.

18. The device of claim 13, wherein the second sub-score is based on a distribution of the identified recognition errors within the recognized text and is calculated as:

$$\frac{-\Sigma_i^N \; Pr(x_i) \, \log(Pr(x_i))}{\log N},$$

where i represents the number of the recognition error in the recognized text, N represents a total count of recognition errors in the recognized text plus one, $x_i$ represents the distance between the $i^{th}$ error and the $(i+1)^{th}$ error including distances between the beginning and ending of the recognized text to a closest adjacent error, and $Pr(x_i)$ represents the probability of a particular value of $x_i$.

19. A non-transitory, computer-readable storage medium storing instructions executable by a processor of a computational device, which when executed cause the computational device to:
receive training data for a plurality of voice calls, wherein the training data for each voice call comprises at least an originating device acoustic signal, a receiving device acoustic signal, reference text, and values for a plurality of key performance indicators (KPIs) for a network over which the voice calls are conducted;
perform automatic speech recognition, for each of the plurality of voice calls, to generate recognized text for both the originating device acoustic signal and the receiving device acoustic signal;
compare, for each of the plurality of voice calls, the recognized text for both the originating device acoustic signal and the receiving device acoustic signal to the reference text to identified recognition errors;
determine, for each of the plurality of voice calls, a voice call quality score for each of the originating device acoustic signal and the receiving device acoustic signal based on the automatic speech recognition and the identified recognition errors,
determine, for each of the plurality of voice calls, a portion of the voice call quality score based on conditions of the network; and
determine, for each KPI of the plurality of KPIs and using the training data, a correlation between the KPI and the portion of the voice call quality score based on conditions of the network.

20. The non-transitory, computer-readable storage medium of claim 19,
wherein the voice call quality score includes a first sub-score based primarily on the accuracy of the automatic speech recognition and a second sub-score based primarily on the distribution of identified recognition errors,
wherein the identified recognition errors further include identified substitution errors, identified deletion errors, and identified insertion errors, wherein the first sub-score is calculated as:

$$\max\left(\frac{c_1 \cdot M - c_2 \cdot S - c_3 \cdot D - c_4 \cdot I}{c_1 \cdot (M + S + D + I)}, 0\right),$$

where M is a count of the number of correct matches, S is a count of the number of substitution errors, D is a count of the number of deletion errors (D), I is a count of the number of insertion errors, and $c_1$-$c_4$ are corresponding weights, and wherein the second sub-score is based on a distribution of the identified recognition errors within the recognized text and is calculated as:

$$\frac{-\Sigma_i^N Pr(x_i) \log(Pr(x_i))}{\log N},$$

where i represents the number of the recognition error in the recognized text, N represents a total count of recognition errors in the recognized text plus one, $x_i$ represents the distance between the $i^{th}$ error and the $(i+1)^{th}$ error including distances between the beginning and ending of the recognized text to a closest adjacent error, and $Pr(x_i)$ represents the probability of a particular value of $x_i$.

* * * * *